United States Patent [19]

Maki et al.

[11] Patent Number: 4,582,891

[45] Date of Patent: Apr. 15, 1986

[54] PROCESS FOR INHIBITING CORROSION OF POLYURETHANE COATING

[75] Inventors: Hirohisa Maki, Neyagawa; Takaya Kawamura; Hidehiro Uchikata, both of Kameoka, all of Japan

[73] Assignee: Dai-Ichi Kogyo Seiyaku Co., Ltd., Kyoto, Japan

[21] Appl. No.: 699,058

[22] Filed: Feb. 6, 1985

[30] Foreign Application Priority Data

Feb. 9, 1984 [JP] Japan .................................. 59-24012

[51] Int. Cl.$^4$ .............................................. C08G 18/36
[52] U.S. Cl. .................................... 528/74.5; 528/905
[58] Field of Search ......................................... 528/74.5

[56] References Cited

U.S. PATENT DOCUMENTS 3,546,148 12/1970 Diamond et al. .................. 528/74.5

Primary Examiner—Maurice J. Welsh
Attorney, Agent, or Firm—Armstrong, Nikaido, Marmelstein & Kubovcik

[57] ABSTRACT

An anti-corrosive polyurethane coating composition which has excellent metal corrosion inhibiting property, water resistance, adhesion property to metals, impact resistance and other properties required for anti-corrosive paints, and can be coated thick with one coating operation, containing as an essential component a polyurethane resin having a density of crosslinking of 1.10 to 2.00 per 1,000 atomic weight of the resin and produced by reaction of (A) a polyol component having a hydroxyl value of 160 to 350 mgKOH/g and being composed of a castor oil polyol alone or a mixture of a castor oil polyol and a low molecular polyol having a functionality of at least 2, preferably at least 3, and (B) a polyisocyanate component in an NCO/active hydrogen ratio of 0.85–1.151 by equivalent.

7 Claims, No Drawings

PROCESS FOR INHIBITING CORROSION OF POLYURETHANE COATING

BACKGROUND OF THE INVENTION

The present invention relates to an anti-corrosive paint, and more particularly to an anti-corrosive polyurethane coating composition which can be applied relatively thick for providing water resisting, corrosion resisting, impact resisting and electrically insulating films.

Hitherto, coal-tar enamels, asphalt and epoxy coal tar paints have been used as anti-corrosive coating compositions. However, they are poor in low temperature characteristics such as curability, brittleness, impact resistance and flexibility. Further, epoxy coal tar paints have a good adhesion property, but have the defects that the coating efficiency and abrasion resistance are bad because the curing time is long and it is hard to coat thick.

Melt coating of polyethylene has also been made for the above purposes. However, it requires a large-scale equipment and is unfit for coating in a small amount. Also, it is difficult to adopt the melt coating onto weld zones and irregular shape portions of steel pipes at the scene of labor.

A main object of the present invention is to eliminate the above-mentioned defects of conventional anti-corrosive coating compositions.

A further object of the present invention is to provide an anti-corrosive coating composition which has excellent corrosion resistance, water resistance, impact resistance and adhesion property to metals and can be applied thick for the purpose of corrosion inhibition, water proofing, formation of impact resistant film or electric insulation.

These and other objects of the present invention will become apparent from the description hereinafter.

SUMMARY OF THE INVENTION

In accordance with the present invention, there is provided an anti-corrosive polyurethane coating composition comprising a polyurethane resin produced by reaction of (A), as a polyol component, a castor oil polyol having a hydroxyl value of 160 to 350 mgKOH/g or a polyol mixture of a castor oil polyol and a low molecular polyol having a functionality of at least 2, the average hydroxyl value of said polyol mixture being from 160 to 350 mgKOH/g, and (B) an organic polyisocyanate compound as a polyisocyanate component in an NCO/active hydrogen ratio of 0.85-1.15/1 by equivalent, said polyurethane resin having a density of crosslinking of 1.10 to 2.00 per 1,000 atomic weight.

The anti-corrosive coating composition of the present invention is satisfactory in various characteristics required for anti-corrosive paints. In particular, the films formed from the composition are low in water absorption and in moisture and water permeations, and are high in electric resistance and show a high electric insulation even if immersed in water, and have good adhesion property to metals, impact resistance, oil resistance, chemical resistance and weathering resistance.

DETAILED DESCRIPTION

The anti-corrosive polyurethane coating composition of the present invention is usually prepared into a two-package paint consisting of a polyol composition containing the polyol component (A), and a polyisocyanate composition containing the polyisocyanate component (B).

In the present invention, a castor oil polyol can be employed alone or in combination with a low molecular polyol having a functionality of at least 2 as a polyol component.

The castor oil polyol used in the present invention includes, for instance, castor oil for general industrial use, purified castor oil, polyhydroxyl polyesters such as interesterification products of castor oil and an ethylene oxide, propylene oxide, butylene oxide or styrene oxide adduct of dipropylene glycol, glycerol or trimethylolpropane and esterification products of ricinoleic acid and an ethylene oxide, propylene oxide, butylene oxide or styrene oxide adduct of dipropylene glycol, glycerol or trimethylolpropane, and the like. These castor oil polyols may be employed alone or in admixture thereof.

In case of using the castor oil polyol alone as a polyol component, it is necessary that it has a hydroxyl value of 160 to 350 mgKOH/g. In case of using the castor oil polyol in combination with the low molecular polyol, the hydroxyl value of the castor oil polyol is not particularly limited and any castor oil polyols can be employed, so long as the average hydroxyl value of the polyol mixture falls within the range of 160 to 350 mgKOH/g. When the hydroxyl value or average hydroxyl value (hereinafter referred to merely as "hydroxyl value") is less than 160 mgKOH/g, the anti-corrosive effect is not sufficient. When the hydroxyl value is more than 350 mgKOH/g, the produced polyurethane resin is very hard and accordingly the impact resistance is lowered. A proper resin hardness is obtained when the hydroxyl value is from 160 to 350 mgKOH/g.

The low molecular polyol to be used in combination with the castor oil polyol in the present invention has a functionality of at least 2, in other words, be a polyol having at least 2 hydroxyl groups in one molecule. Preferably, the hydroxyl value of the low molecular polyol is from 30 to 1,300 mgKOH/g. A low molecular polyol having a functionality of at least 3 is preferred than a low molecular polyol having a functionality of 2, since the water resistance, water permeability and water absorption of the polyurethane resin are better and the resin is hard to be hydrolyzed. Aliphatic glycols such as ethylene glycol, propylene glycol and butylene glycol are employed in the invention as a low molecular polyol having a functionality of 2. Examples of the low molecular polyol having a functionality of at least 3 are, for instance, glycerol, trimethylolpropane, pentaerythritol, sorbitol, alkylene oxide adducts of these polyols, alkylene oxide adducts of ethanolamine, diethanolamine, ethylenediamine, and the like. The low molecular polyols may be employed alone or in admixture thereof. The castor oil polyol and the low molecular polyol can be employed in all proportions, so long as the average hydroxyl value falls within the range of 160 to 350 mgKOH/g.

The organic polyisocyanate compound used in the present invention includes aromatic polyisocyanates, aliphatic polyisocyanates and alicyclic polyisocyanates, and mixtures thereof. Among them, aromatic polyisocyanates such as tolylene diisocyanate (TDI) and diphenylmethane diisocyanate (MDI) are particularly preferable. The polyisocyanate compound is used in an amount such that the ratio of isocyanato group (NCO)

to the active hydrogen atom of the polyol is from 0.85 to 1.15:1 by equivalent, preferably 0.90 to 1.10:1 by equivalent. When the ratio is less than 0.85, the obtained polyurethane resin is poor in water resistance, and when the ratio is more than 1.15, foaming takes place and the obtained resin contains bubbles.

Even if the hydroxyl value of the castor oil polyol or polyol mixture used falls within the range of 160 to 350 mgKOH/g, there are cases where the formed polyurethane resin is subject to deterioration due to moisture and heat or hydrolysis depending on the kind of the organic polyisocyanate compound to be reacted and accordingly is not suited for use in anti-corrosive paints. It has now been found by the present inventors that the density of crosslinking of the formed polyurethane resin is important and the polyurethane resin suited for metal corrosion inhibition can be obtained only when the density of crosslinking thereof falls within the range of 1.10 to 2.00 per 1,000 atomic weight. When the crosslinking density is less than the above range, the formed polyurethane resin is inferior in resistances to moisture and heat. When the crosslinking density is more than the above range, the formed resin becomes fragile and the impact resistance is lowered.

The term "density of crosslinking" as used herein is defined as follows: That is to say, in case of a polyurethane resin formed by reacting a polyol mixture of $W_1$ g of a polyol having a molecular weight $MW_1$ and a functionality $F_1$ and $W_2$ g of a polyol having a molecular weight $MW_2$ and a functionality $F_2$ with $W_3$ g of a polyisocyanate having a functionality $F_3$, the crosslinking density CD of the resin per 1,000 atomic weight is represented by the following equation.

$$CD = \frac{[W_1(F_1 - 2)/MW_1] + [W_2(F_2 - 2)/MW_2] + [W_3(F_3 - 2)/MW_3]}{W_1 + W_2 + W_3} \times 1000$$

For instance, in case of a polyurethane resin formed by reaction of 100 g of castor oil (hydroxyl value 161, functionality 2.67, molecular weight 930.5) and 41.0 g of crude diphenylmethane diisocyanate (NCO equivalent 135, functionality 2.55, molecular weight 344.0) (NCO/OH ratio=1.05), the crosslinking density CD of the resin is as follows:

$$CD = \frac{[100(2.67 - 2)/930.5] + [41.0(2.55 - 2)/344.0]}{100 + 41.0} \times 1000$$

$$= 0.98$$

The anti-corrosive polyurethane coating composition of the present invention contains the polyurethane resin defined above as an essential component, and has excellent inhibitory effect on corrosion of metals and impact resistance as well as good workability. adhesion to metals and other properties.

The anti-corrosive coating composition of the present invention may contain usual paint additives, as occasion demands, such as an inorganic filler, an antifoaming agent, a catalyst, a plasticizer and a solvent. Examples of the inorganic filler are, for instance, calcium carbonate, surface-treated calcium carbonate, talc, kaolin, silica sand, mica, glass flake, silica, iron oxide, carbon, and the like. Examples of the antifoaming agent are, for instance, synthetic zeolite, quick lime, soluble anhydrous gypsum, and the like. Any catalysts such as tin catalysts and lead catalysts generally used for formation of polyurethane are employed as a catalyst. Examples of the plasticizer are, for instance, phthalic acid esters, benzoic acid esters, adipic acid esters, process oil, liquid petroleum resin, chlorinated paraffin, tar, and the like. Examples of the solvent are, for instance, methylene chloride, toluene, xylene, ethyl acetate, and the like. When it is desired to obtain a coating composition which can be applied thick, it is preferable to use a solvent in as small amounts as possible.

By suitably incorporating additives into the composition of the invention, it is possible to apply the composition with a film thickness of 2 to 3 mm. (dry) by one application procedure and moreover with decreased foaming.

The anti-corrosive coating composition of the invention is applicable for corrosion inhibition to metals such as steel, aluminum, tin and cast iron, for instance, in the form of pipe, tube, rod, plate or can. In case of applying the coating composition to metal substrates, it is desirable to conduct a surface treatment such as degreasing, derusting or rubbing for increasing the adhesion property to the metal substrates.

The preparation of the coating composition of the present invention is not limited to a particular process. For instance, there can be adopted a one-shot process in which a polyol composition (A) into which optional components are incorporated, and a polyisocyanate composition (B) are admixed in a predetermined ratio, or a prepolymer process in which a part of a polyol is added to a polyisocyanate compound to form a prepolymer composition (B) containing an isocyanate prepolymer, and the composition (B) is admixed in a predetermined ratio with a polyol composition (A) containing the remaining polyol with optional components.

The anti-corrosive coating composition of the present invention is useful as anti-corrosive paints for crude oil reserve tank, petroleum tank, steel structures of various plants, sea structures, steel pipe and cast iron pipe, and as surface paints of iron or steel boards.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

To 100 parts of ricinoleic acid triglyceride as castor oil polyol (hydroxyl value: 180 mgKOH/g, functionality: 3, molecular weight: 935) were added 100 parts of talc, 2.5 parts of synthetic zeolite, 0.05 part of dibutyl tin dilaurate and 5.0 parts of carbon, and they were uniformly admixed to give a polyol composition (A). Crude diphenylmethane diisocyanate (hereinafter referred to as "MDI") (NCO equivalent: 136) was used as a polyisocyanate composition (B). The polyol composition (A) was admixed with the polyisocyanate composition (B) in a ratio of 4.53:1.00 by weight to form an anti-corrosive coating composition (NCO/OH ratio: 1.05/1 by equivalent).

The coating composition was applied to a shot blasted iron plate by an airless spray to form a film having a thickness of 0.50 mm. Also, the composition was sprayed onto a release paper in the same manner to form a sheet having a thickness of 1.5 mm. After aging the film and sheet at room temperature for 7 days, they were subjected to the following tests.

The obtained film was subjected to measurements of hardness, water absorption, impact resistance and flexibility. The water absorption was measured according to Japanese Industrial Standard (JIS) K 6911, and the impact resistance and flexibility were measured according to JIS K 5664.

Also, with respect to the obtained sheet, the volume resistivity was measured before and after dipping in hot water at 50° C. for 30 days.

The results are shown in Table 1.

The crosslinking density of the polyurethane resin obtained in this Example was 1.24.

EXAMPLE 2

A polyol composition (A) was prepared by uniformly admixing 100 parts of a recinoleic acid ester as a castor oil polyol (commercially available under the trade mark "Uric-H73" made by Ito Seiyu Kabushiki Kaisha) (hydroxyl value: 270, functionality: 3), 100 parts of talc, 2.5 parts of synthetic zeolite, 0.05 part of dibutyl tin dilaurate and 5.0 parts of carbon.

A polyisocyanate compound (commercially available under the trade mark "Coronate L" made by Nippon Polyurethane Kogyo Kabushiki Kaisha) (addition product of 1 mole of trimethylolpropane and 3 moles of TDI, free NCO: 13.2%, functionality: 3) was used as a polyisocyanate composition (B).

The composition (A) was admixed with the composition (B) in a ratio of 1.29:1.00 by weight, and xylene was then added to the mixture in an amount of 10.0% based on the weight of the mixture to give an anti-corrosive coating composition.

The coating composition was coated by a brush onto a shot blasted steel plate to form a film having a thickness of 0.20 mm. Also, a sheet having a thickness of 1.0 mm was formed by brush-coating the composition onto a release paper in the same manner.

With respect to the obtained film and sheet, the physical properties were measured. The results are shown in Table 1.

The crosslinking density CD of the polyurethane resin obtained in this Example was 1.26.

TABLE 1

|  | Example 1 | Example 2 |
| --- | --- | --- |
| Shore D hardness | 55 | 67 |
| Water absorption (%) | 0.50 | 0.75 |
| Volume resistivity ($\Omega \cdot m^2$) |  |  |
| Initial | $5.8 \times 10^{14}$ | $7.0 \times 10^{15}$ |
| After dipping in water at 50° C. for 30 days | $1.2 \times 10^{14}$ | $3.2 \times 10^{15}$ |
| Impact resistance | No cracking and no peeling off | No cracking and no peeling off |
| Flexibility | Endurable to round rod of 5 mm in diameter | Endurable to round rod of 5 mm in diameter |

EXAMPLE 3 AND COMPARATIVE EXAMPLES 1 TO 3

The anti-corrosive polyurethane coating composition prepared in Example 1 was applied in thickness of 1.5 mm to a steel pipe (inner diameter: 1 m), and was aged at room temperature for 7 days (Example 3).

For comparison, the following test specimens were also prepared. An asphalt primer was applied to the same steel pipe as above, and thereon molten asphalt was then applied in thickness of 5 mm (Comparative Example 1). A coal tar primer was applied to the same pipe as above, and thereon molten coal tar was then applied in thickness of 5 mm (Comparative Example 2). A primer for tar epoxy resins was applied to the same pipe as above, and a commercially available tar epoxy resin paint was then applied in thickness of 1,500 μm (wet) and dried (Comparative Example 3).

By employing the thus prepared specimens, the impact resistance was measured according to JIS G 3492. The results are shown in Table 2.

TABLE 2

| Anticorrosive paint | Impact resistance | |
| --- | --- | --- |
|  | at −5° C. | at −30° C. |
| Example 3 | 0.8 | 1.0 |
| Com. Ex. 1 | 18 | >65 |
| Com. Ex. 2 | 35 | >65 |
| Com. Ex. 3 | 3.1 | 4.5 |

It is observed in Table 2 that the anti-corrosive coating composition of the present invention has an excellent impact resistance.

EXAMPLES 4 AND 5 AND COMPARATIVE EXAMPLES 4 TO 7

A polyol composition (A) was prepared by uniformly admixing 100 parts of the polyol mixture shown in Table 3, 30 parts of tar, 30 parts of carbon, 30 parts of mica, 2.5 parts of synthetic zeolite and 0.2 part of dibutyl tin dilaurate. Crude MDI was used as a polyisocyanate composition (B), and it was admixed in an amount shown in Table 3 with the composition (A) to form an anti-corrosive coating composition.

The coating composition was coated on a release paper to form a film having a thickness of about 2.0 mm. After aging the film at room temperature for 7 days, the hardness of the film was measured (initial hardness). Also, with respect to the film dipped in a 10% aqueous solution of NaOH at 80° C. for 14 days, the hardness was measured.

Also, the coating composition was applied in a thickness of about 1.5 mm to a shot blasted steel plate, and after aging at room temperature for 7 days, the physical properties of the film were measured by a testing method for tar epoxy resin paints provided in JIS K 5664.

The results are shown in Table 2.

In Table 2, the adhesion property was estimated by cross-cutting a film formed on a shot blasted steel plate, dipping in a 3% aqueous solution of sodium chloride at 50° C. for 1 month and observing peeling off of the film.

TABLE 3

|  | Ex. 4 | Ex. 5 | Com. Ex. 4 | Com. Ex. 5 | Com. Ex. 6 | Com. Ex. 7 |
|---|---|---|---|---|---|---|
| Low molecular polyol (part) | | | | | | |
| Glycerol-propylene oxide adduct (OH value 473 mgKOH/g) | — | 31.7 | — | — | — | 10.0 |
| Ethylenediamine-propylene oxide adduct (OH value 776 mgKOH/g) | 19.3 | — | 35.9 | — | — | — |
| Castor oil (part) (OH value 161 mgKOH/g) | 80.7 | 68.3 | 64.1 | 80.0 | 66.0 | — |
| Other polyols (part) | | | | | | |
| Trimethylolpropane (OH value 1256 mgKOH/g) | — | — | — | — | 4.0 | — |
| Dipropylene glycol (OH value 280 mgKOH/g) | — | — | — | 20.0 | — | 90.0 |
| Bisphenol A-propylene oxide adduct (OH value 326 mgKOH/g) | — | — | — | — | 30.0 | — |
| Average hydroxyl value (mgKOH/g) | 280 | 260 | 380 | 184.8 | 254.3 | 299.3 |
| Amount of MDI (B) (part) | 70.7 | 65.7 | 96.0 | 46.9 | 64.3 | 75.6 |
| Crosslinking density | 1.78 | 1.47 | 2.29 | 0.90 | 1.907 | 0.85 |
| Shore D hardness | | | | | | |
| Initial | 73 | 75 | 90 | 41 | 56 | 80 |
| After dipping | 70 | 73 | 88 | 15 | 53 | 32 |
| Water absorption* (%) | +1.4 | +1.5 | +1.0 | +5.1 | +3.2 | +10.3 |
| Flexibility** | O | O | X | O | O | O |
| Impact resistance** | O | O | X | O | O | O |
| Alkali resistance** | O | O | O | O | O | O |
| Acid resistance** | O | O | O | O | O | O |
| Appearance after 3 cycles of cooling and heating (−20° C. and 80°)** | O | O | O | O | O | O |
| Moisture resistance** | O | O | O | O | O | O |
| Salt spray test** | O | O | O | X | O | O |
| Gasoline resistance | O | O | O | O | O | O |
| Adhesion | good | good | peeling | peeling | peeling | peeling |

(Note)
O : pass
X : failure
*measured according to JIS K 6911
**measured according to JIS K 5664

It is observed in Table 3 that the films formed from the anti-corrosive coating compositions of the present invention show little change in hardness even if dipped in a 10% aqueous NaOH solution at 80° C. for 14 days, and have a very low water absorption and an excellent adhesion property. Thus, it would be understood that the coating compositions of the invention have an excellent anti-corrosive property. It is also observed in Table 3 that the films of Comparative Examples show a large change in hardness and a large water absorption, and peeling off of the films occurs in the adhesion test, thus it would be understood that the anti-corrosive property is bad.

In addition to the ingredients used in the Examples, other ingredients can be used in Examples as set forth in the specification to obtain substantially the same results.

What we claim is:

1. A process for inhibiting corrosion of metals which comprises applying an anti-corrosion polyurethane coating composition to a metal substrate, said composition comprising a polyurethane resin produced by reaction of (A), as a polyol component, a castor oil polyol having a hydroxyl value of 160 to 350 mg KOH/g or a polyol mixture of a castor oil polyol and a low molecular polyol having a functionality of at least 2, the average hydroxyl value of said polyol mixture being from 160 to 350 mg KOH/g, and (B) an organic polyisocyanate compound as a polyisocyanate component in an NCO/active hydrogen ratio of 0.85–1.15/1 by equivalent, said polyurethane resin having a density of crosslinking of 1.10 to 2.00 per 1,000 atomic weight.

2. The process of claim 1, wherein said castor oil polyol is a member selected from the group consisting of: castor oil; an interesterification product of castor oil and an ethylene, propylene, butylene or styrene oxide adduct of dipropylene glycol, glycerol or trimethylolpropane; and an esterification product of ricinoleic acid and an ethylene, propylene, butylene or styrene oxide adduct of dipropylene glycol, glycerol or trimethylolpropane.

3. The process of claim 1, wherein said low molecular polyol has a hydroxyl value of 30 to 1,300 mg KOH/g.

4. The process of claim 1, wherein said low molecular polyol has a functionality of at least 3.

5. The process of claim 1, wherein said low molecular polyol is a member selected from the group consisting of glycerol; trimethylolpropane; pentaerythritol; sorbitol; an ethylene, propylene or butylene oxide adduct of glycerol, trimethylolpropane, pentaerythritol or sorbitol; and an ethylene, propylene or butylene oxide adduct of ethanolamine, diethanolamine or ethylenediamine.

6. The process of claim 1, wherein said metal substrate is a pipe, tube, rod, or plate which is made of a metal selected from the group consisting of steel, aluminum, tin and cast iron.

7. The process of claim 1, wherein said metal substrate is a crude oil reserve tank, a petroleum tank, a steel structure of a plant, or a sea structure.

* * * * *